United States Patent [19]

Hori et al.

[11] 4,022,315

[45] May 10, 1977

[54] BOTTLE HANDLING APPARATUS

[75] Inventors: Hiroshi Hori; Kazunori Tuchimoto, both of Kanazawa, Japan

[73] Assignee: Shibuya Kogyo Company, Ltd., Kanazawa, Japan

[22] Filed: July 25, 1975

[21] Appl. No.: 599,157

[30] Foreign Application Priority Data

Aug. 5, 1974 Japan .............................. 49-89615

[52] U.S. Cl. ................................ 198/471; 198/480; 198/482; 198/485

[51] Int. Cl.² .......................................... B65G 47/00

[58] Field of Search .................. 198/22 R, 22 B, 24, 198/27, 25, 471, 482, 485, 480

[56] References Cited

UNITED STATES PATENTS

| | | | |
|---|---|---|---|
| 3,072,239 | 1/1963 | Jones et al. | 198/24 |
| 3,178,005 | 4/1965 | Read | 198/24 |
| 3,233,718 | 2/1966 | Ladewig et al. | 198/24 |
| 3,568,816 | 3/1971 | Smith | 198/24 |
| 3,643,780 | 2/1972 | Shimogaki et al. | 198/25 |

FOREIGN PATENTS OR APPLICATIONS

| | | | |
|---|---|---|---|
| 69,214 | 12/1926 | Sweden | 198/27 |

*Primary Examiner*—Johnny D. Cherry
*Assistant Examiner*—Douglas D. Watts
*Attorney, Agent, or Firm*—Woodhams, Blanchard and Flynn

[57] ABSTRACT

A bottle handling apparatus in which bottles being fed continuously to the apparatus are ejected from a feed device into groups of a given size and are loaded as groups into a series of bottle holders on a bottle-handling conveyor of the apparatus by bottle insertion means arranged at a plurality of stages along the conveyor. The different stages of the insertion means causes the bottle groups to be regularly inserted into the bottle holders in a alternate or regularly spaced sequence. The delivery side of the bottle handling conveyor is provided with bottle removal means arranged at a plurality of stages along the feed direction of the conveyor.

13 Claims, 6 Drawing Figures

BOTTLE HANDLING APPARATUS

FIELD OF THE INVENTION

This invention relates to improvements in bottle handling apparatus, for example a bottle washing machine, and is particularly concerned with improvements in bottle supply and delivery mechanisms.

BACKGROUND OF THE INVENTION

Usually in this kind of bottle handling apparatus, the discharge end of the bottle feeding conveyor is arranged parallel to the supply end of the bottle handling conveyor of say, a bottle washer, and the bottles coming along the bottle feeding conveyor are lined up in groups of a certain number and are pushed off the conveyor to one side of it by an ejection device, whereby bottles so ejected are put into the holders of the above mentioned bottle handling conveyor by a bottle insertion means such as a chute. In addition, on the delivery side of the machine the bottles are put onto the delivery conveyor by the bottle removal means.

Therefore, after the arrival of a certain number of bottles on the bottle feeding conveyor the bottle supply operation is repeated intermittently and then the handling and bottle delivery operations follow it. Because of this, there are limits to the bottle handling efficiency which can be expected. Apparatus has been proposed in which the bottles are supplied to both sides of the bottle handling conveyor. However, this increases the width of the bottle handling coveyor, which results in making the apparatus physically larger. There is a further inconvenience in case of handling profiled bottles such as oval bottles which are directional due to labelling considerations. When such bottles packed in a box in the same direction are removed and put on the bottle feeding conveyor from both sides thereof, the directions of the bottles become reversed at the receiving portion of the bottle handling conveyor. Thus, the known apparatus are disadvantageous and unsuitable for practical use.

It is an important object of the present invention to overcome the above mentioned disadvantages of the known apparatus.

An object of the present invention is to make the bottle insertion or supply means of a multistage construction to provide a bottle handling apparatus which is able to work at extremely high efficiency even when handling profiled bottles whose collecting and selecting operation is difficult.

According to the present invention there is provided bottle handling apparatus in which bottles being fed continuously to the apparatus are ejected from the feed in groups of a given size and are loaded as groups into a series of bottle holder positions on a bottle-handling conveyor of the apparatus by bottle insertion means arranged at a plurality of stages along said conveyor, a first stage of the insertion means putting bottle groups in turn into alternate or other regularly-spaced locations in the series of holder positions and holder positions left vacant by said first stage are supplied by a subsequent stage or subsequent stages similarly filling regularly-spaced locations.

Preferably, the delivery side of the bottle handling conveyor is provided with bottle removal means arranged at a plurality of stages along the feed direction, a first of said stages removing bottle groups from alternate or other regularly-spaced locations in the series of bottle holder positions of said bottle handling conveyor, and the bottle groups not removed by the first stage being similarly removed from regularly-spaced locations by a subsequent stage or subsequent stages of said removal means.

By making the bottle insertion means multistage in construction, a bottle handling apparatus can be provided which is able to work at extremely high efficiency even in handling profiled bottles the collection and selection of which is difficult. In comparison with known single-sided bottle supply mechanism, using single-stage bottle feed, the apparatus according to the invention means that adequate bottle supply efficiency can be maintained even under conditions of low speed of bottle feed and of the bottle insertion operation; thus stable continuous and trouble-free operation may be achieved. Also with the increase of bottle supply efficiency, handling efficiency of the bottle handling apparatus itself can be much more developed. For a given capacity, the bottle handling apparatus can be made smaller, and this reduces machine size and also the cost of installation expenditure. In particular, the multistage bottle supply mechanism makes possible an effective use of space without increasing the width of the apparatus, so that rational conveyor handling and compact installation can be achieved.

With the above construction, without making the apparatus larger, it is possible not only to improve bottle delivery efficiency remarkably but also to handle various types of bottles consistently at the same time, thus, the present invention facilitates the achievement of a rational lay-out of the whole bottle handling system.

BRIEF DESCRIPTION OF THE DRAWINGS

The structure of this invention will be hereinafter set forth in connection with certain preferred forms as shown in the drawings, wherein.

DETAILED DESCRIPTION

Figure 1:
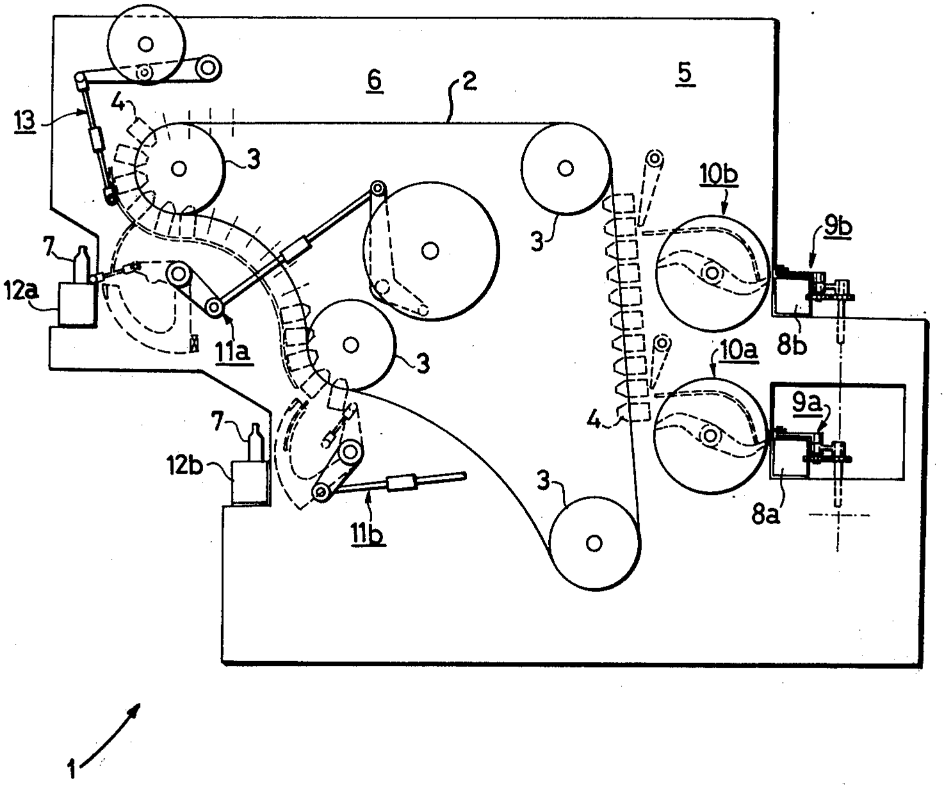
FIG. 1 illustrates the whole bottle handling apparatus.

In FIG. 1, the bottle handling apparatus 1 for a bottle washer is shown, in which the bottle handling conveyor 2 is arranged to circulate in endless condition by a plurality of guide rollers 3, and plural holder rows 4 constitute a part of this bottle handling conveyor. The right part of FIG. 1 shows the bottle supply mechanism 5, while the left part shows the bottle delivery mechanism 6. The bottle supply mechanism 5 comprises bottle-feed means which has conveyors 8*a* and 8*b* as respective upper and lower stages. Bottles 7 are continuously carried along conveyors 8*a* and 8*b*, and ejection devices 9*a* and 9*b* push out the bottles 7 over the side of said conveyor having lined them up by groups of a certain number. The supply mechanism 5 also comprises bottle insertion means, again in two stages (upper and lower) 10*a* and 10*b*. The lined up bottle groups which have been ejected are guided by the bottle insertion means into alternate holder rows 4 of the holder series, so as to slope forwards with respect to the supply side of said bottle handling conveyor.

The bottle delivery mechanism 6 comprises bottle removal means having two stages (upper and lower) 11*a* and 11*b* which alternately take out the lined up bottle groups from alternate holder rows 4 at the curved portion formed by the two guide rollers 3 on the delivery side of the bottle handling conveyor 2. The delivery conveyors 12*a* and 12*b* deliver the lined up bottle groups removed after treatment. The delivery mechanism further comprises a bottle blocking mechanism, 13 whereby alternate holder rows 4 in the holder series cooperate with the bottle remover 11*a* of the upper stream and the rest cooperate with the bottle remover 11*b* of the lower stream.

Figure 3:
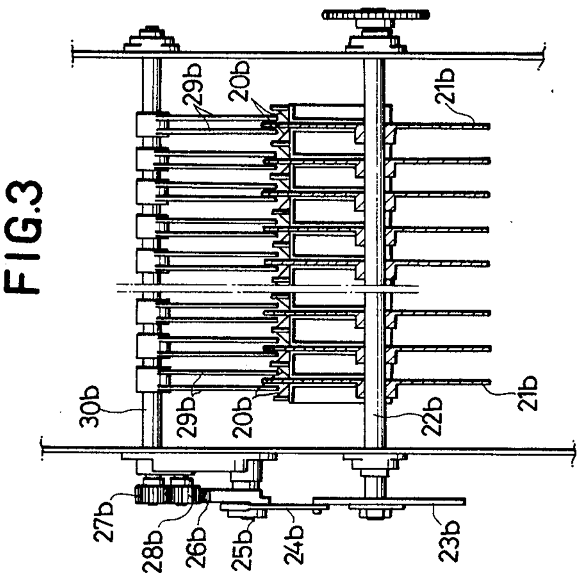
FIG. 3 is a front view thereof.
Figure 2:
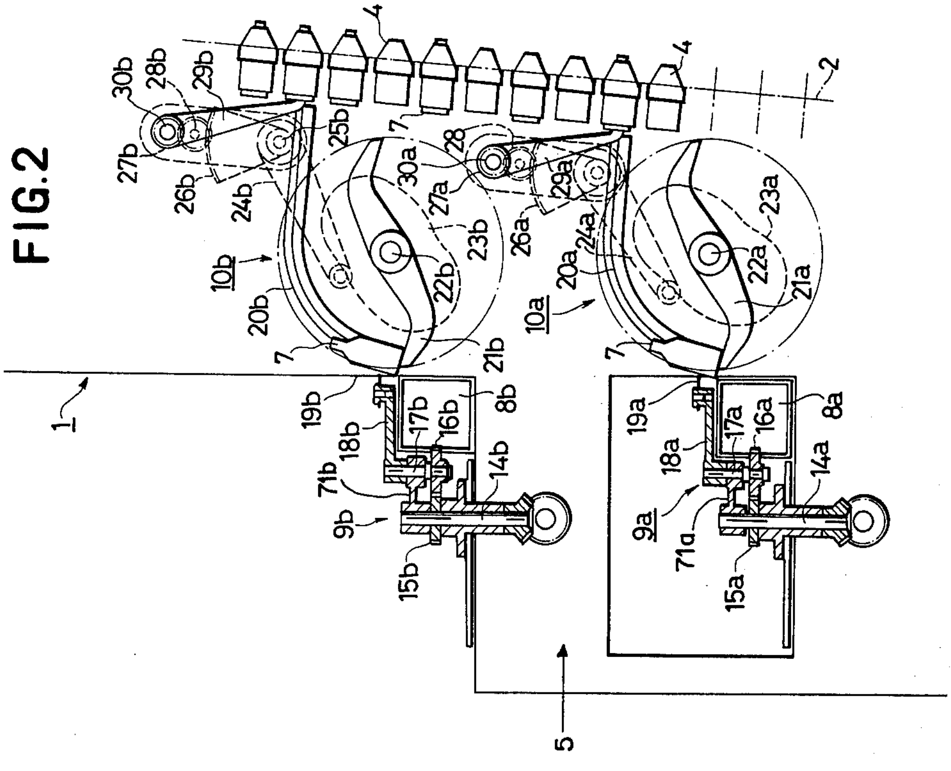
FIG. 2 is a side sectional view of the bottle supply mechanism.
Figure 4:
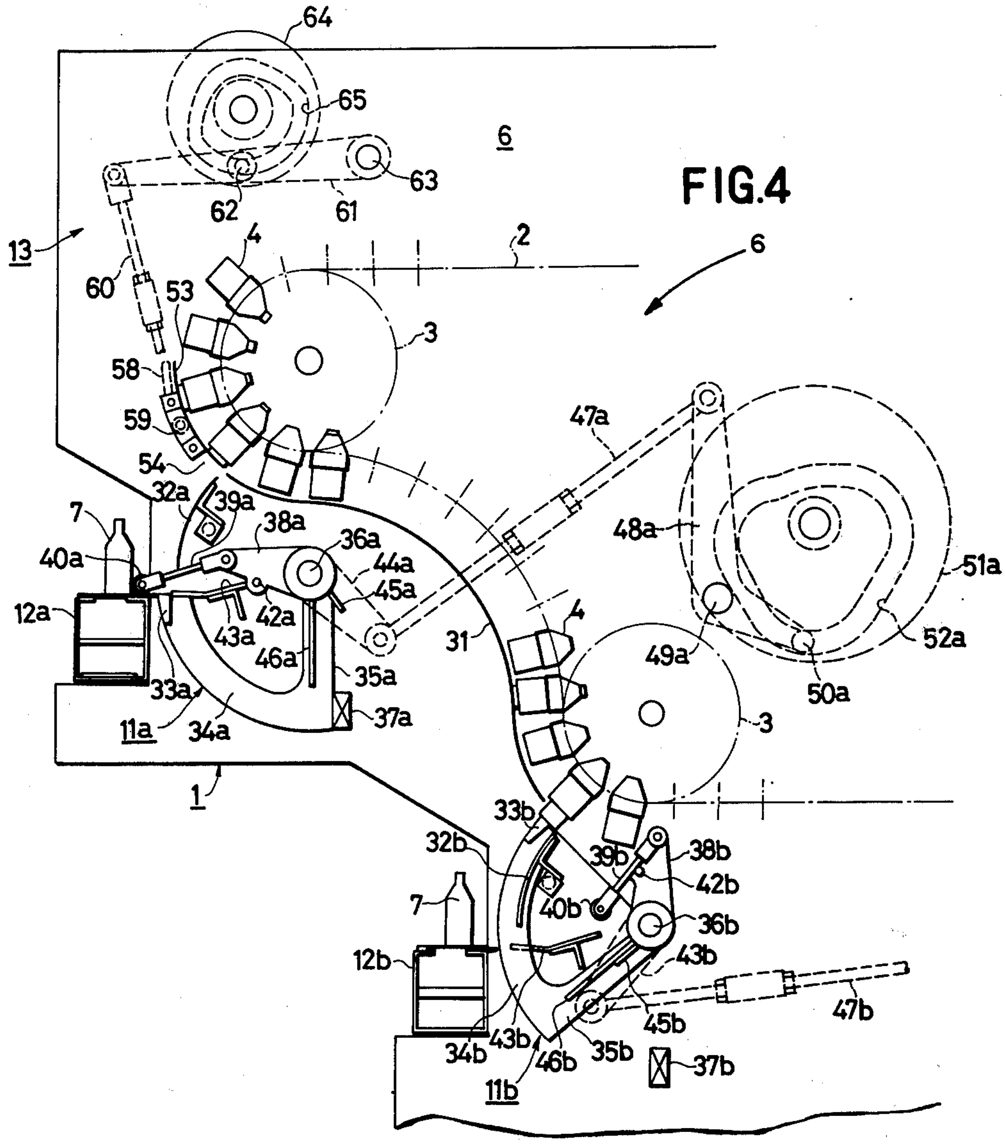
FIG. 4 is a side sectional view of the bottle delivery mechanism.
Figure 5:
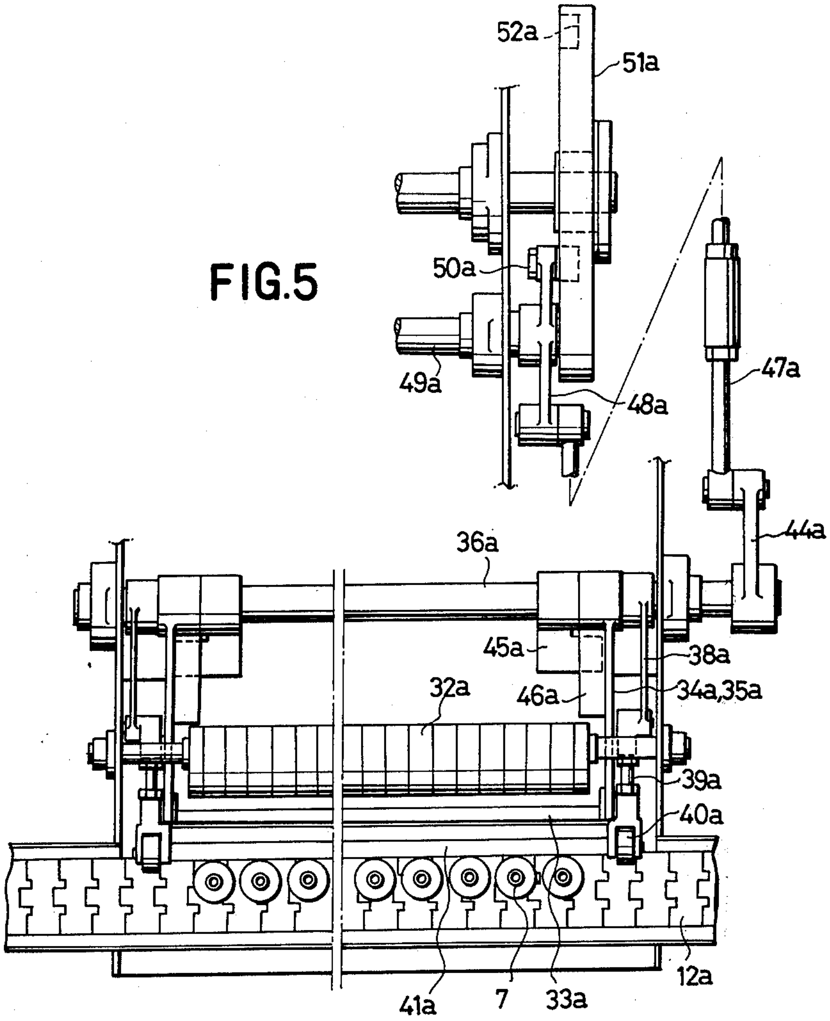
FIG. 5 is a plan thereof.
Figure 6:
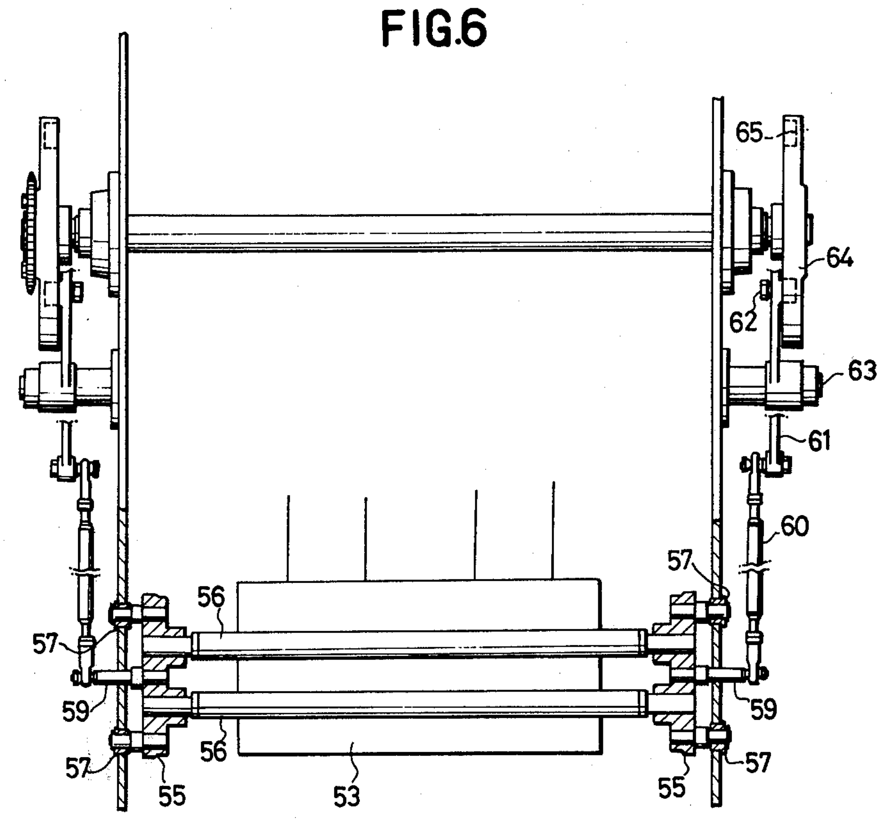
FIG. 6 is a plan of the bottle staying mechanism.

The above mentioned bottle supply mechanism, 5 is shown more concretely in FIGS. 2 and 3, and the bottle delivery mechanism 6 in FIGS. 4 to 6.

In FIGS. 2 and 3 pairs of driving shafts 14*a* and 14*b* (the other of each pair is not shown) are arranged at the ends of the bottle feeding conveyors 8*a* and 8*b* respectively, the shafts being interlocked by the same driving source and fixed gears 15*a* and 15*b* are fitted adjacent the upper ends of the driven shafts. Planet gears 16*a* and 16*b* roll about and are meshingly engaged to each of the fixed gears, which planet gears have the fulcrum shafts 17*a* and 17*b* thereof rotatably supported radical arm pieces 71a and 71b which are fixed to and extend from the top of the driving shafts 14*a* and 14*b*. At the top of these fulcrum shafts 17*a* and 17*b*, there is mounted arms 18*a* and 18*b* and between the tops of the respective arms in the pairs there is connected the bottle pushing levers 19*a* and 19*b*. Therefore, with this form of ejection device 9*a* and 9*b* and having such a planet gear mechanism, when adjacent a group of lined up bottles 7 the pushing out stroke is comparatively gentle. It is also possible to give the ejection motion a quick return stroke.

Guide pieces 20*a* and 20*b* are curved above the arc made between the position for pushing out motion and the holder position separated up and down of the bottle handling conveyor. As shown in FIG. 3, pairs of guide pieces 20*a* and 20*b* separated at the center position so as to hold the bottles 7 from both sides are arranged in parallel, there being as many pairs of guide pieces as the number of the lined up bottles. A plurality of insertion fingers 21*a* and 21*b* which rotate, being supported by shafts 22*a* and 22*b* under each guide piece 20*a* and 20*b*, put each bottle 7 into one of the holders 4 by abutting the bottom of each bottle 7 as shown with their tops projecting along the separating center portion of the guide pieces 20*a* and 20*b*. Cocoon shaped cams 23*a* and 23*b* are fixed to the shafts 22*a* and 22*b*, and levers 24*a* and 24*b* whose one end is engaged to the cams 23*a* and 23*b* have supporting shafts 25*a* and 25*b* at the other end to which segment gears 26*a* and 26*b* are fixed. Driven gears 27*a* and 27*b* are engaged to the segment gears 26*a* and 26*b* by means of intermediate gears 28*a* and 28*b*. Bottle pushing fingers 29*a* and 29*b* are secured to the driven gear shafts 30*a* and 30*b* and consist of two flat pieces which are arranged so as to correspond to the curved guide pieces 20*a* and 20*b*, respectively.

Because of the above construction, in accordance with these bottle insertion means 10*a* and 10*b*, insertion fingers 21*a* and 21*b* rotate corresponding to the pushing out operation timing of the ejection devices 9*a* and 9*b* and each group of the lined up bottles 7 are guides above the guide pieces 20*a* and 20*b*. Because at the same time cams 23*a* and 23*b* rotate clockwise in FIG. 2 the segment gears 26*a* and 26*b* start to rotate clockwise with the levers 24*a* and 24*b*, while the bottle pushing fingers 29*a* and 29*b* start to rotate counterclockwise due to the connection with the gears 27*a* and 27*b* engaged by the intermediate gears 28*a* and 28*b*. As clear from the shape of the cams 23*a* and 23*b*, during each half revolution of the insertion fingers 21*a* and 21*b* the bottle pushing fingers 29*a* and 29*b* initially swing counterclockwise in FIG. 2, whereby the bottle pushing fingers 29*a* and 29*b* permit the bottles 7 to pass due to said fingers swinging upward to the left, whereupon the fingers 29*a* and 29*b* then swing clockwise and load the bottles 7 into each holder into 4 by pushing the bottom of the bottles 7. Moving speed of the bottle conveyor is controlled so that each bottle insertion means 10*a* and 10*b* puts each bottle 7 into the holder positions alternately, and the holder positions left vacant by the bottle insertion means 10*a* of the upper stream are loaded with the lined up bottle groups by the bottle insertion means 10*b* of the the lower stream. Then the bottles are transported to the bottle handling or treatment process.

In FIGS. 4 and 5 which show the bottle delivery mechanism 6, a bottle bottom guide 31 is arranged so as to prevent the deviation of the bottles 7 along the turning part of the bottle handling conveyor 2 formed between the two guide rollers. Adjacent the upper and lower edges of the bottle bottom guide there are provided removal guide boards 32*a* and 32*b* for the lined up bottles, which removal guide boards are curved downward. Bottle bottom supports 33*a* and 33*b* are supported from the both sides by arcuate supporting boards 34*a* and 34*b* so as to be swingably movable along the removal guide boards 32*a* and 32*b* and radial arms 35*a* and 35*b* are integral with the boards 34*a* and 34*b* at the opposite ends from the supports 33a and 33b. These radial arms 35*a* and 35*b* supported by shafts 36*a* and 36*b*, with the back edge adapted to abut stoppers 37*a* and 37*b*, can elevate as hereinafter set forth between the lowering position wherein the bottom supports 33*a* and 33*b* are at the same level with the delivery conveyors 12*a* and 12*b* and the lifting position wherein the bottle bottom supports 33*a* and 33*b* are adjacent the edges of the bottle bottom guide 31.

Levers 38*a* and 38*b* are rigidly supported on shafts 36*a* and 36*b*. Pushing elements 39*a* and 39*b* are pivoted to levers 38*a* and 38*b*, which levers have rollers 40*a* and 40*b* thereon and between which bottle pushing bars 41*a* and 41*b* (FIG. 5) are fitted. When the levers 38*a* and 38*b* lift, pins 42*a* and 42*b* prevent excessive downward swing caused by the weight of the pushing levers 39*a* and 39*b* themselves.

During the bottle lowering and moving operation motion, the rollers 40*a* and 40*b* roll between the top surface of the bottle bottom supports 33*a* and 33*b* in the lower position the delivery conveyors 12*a* and 12*b* forming a continuous surface therewith), and top surface of receiving boards 43*a* and 43*b* bars. Thus it is possible to advance the bottle pushing bars 41*a* and 41*b* and push out each group of the lined-up bottles onto the delivery conveyors 12*a* and 12*b*. Other levers 44*a* and 44*b* are connected to the end of the shafts 36*a* and 36*b* and flanges 45*a* and 45*b* are fixed to the shafts 36*a* and inwardly of the radial arm 35a and 35b. The rotational motion of the other levers 44*a* and 44*b* is transmitted to the arcuate supporting boards 34*a* and 34*b* by the contact of the flanges 45*a* and 45*b* with side shoulders 46*a* and 46*b* on the radial arms 35*a* and 35*b*. Therefore, the levers 38*a* and 38*b* are caused to swing upwards before that of said arms 35*a* and 35*b*, and the downward swing of the levers 38*a* and 38*b* continues after the end of that of said arms 35*a* and 35*b*. Links 47*a* and 47*b* are connected at their levers 44*a* and 44*b* and to the other ends to respective arms of a pair of bell cranks (only one of which 48a is shown). The bell crank 48a is supported by shaft 49*a*. Pin 50*a* disposed at the end of the other arm of crank 48*a* is engaged in channel 52*a* of cam piece 51*a*.

Because each bottle remover 11*a* and 11*b* is arranged like the above structure, during one rotation of the cam piece 51*a* in FIG. 4 the bell crank 48*a* first moves counter clockwise about the shfat 49*a* and also the lever 44*a* interlocked by the link 47*a* moves clockwise with the arm 35*a* and the arcuate supporting board 34*a* which is integral with arm 35*a* by contact of the flange 45*a* with the side shoulder 46*a*. when the motion if forward as above described, the bottle pushing bar 41a is maintained in a retracted position, and the bottle bottom support 33*a* lifts and supports the line of bottles 7 which are in the holder row 4, thereby assuming the position thereof as shown in FIG. 4 by the bottle remover 11*b* of the lower stream. On the other hand, when the motion is back, the bottle bottom support 33*a* guides the group of the bottles 7 along the removal guide board 32*a*, the lever 38*a* and the pushing lever 39*a* interlock to advance the bottle pushing bar 41*a*, and after the bottle bottom support 33*a* reaches its lowered position, the lined up bottle group is pushed onto the delivery conveyor 2*a*, as mentioned above. These bottle removal operations are repeated by each bottle remover 11*a* and 11*b* against the alternate holder rows 4 of the bottle handling conveyor 2.

The following is the description of the bottle blocking means 13 which makes this alternate operation possible. In FIGS. 4 and 6, adjacent the upper front edge of the bottle bottom guide 31*a* shielding board 53 is arranged so as to leave the gap 54 between the two. The board 53 can slide so as to open or close the gap 54 which serves for taking out the bottle group from the holder row 4. A mounting frame 55 is arranged to carry both ends of the levers 56 which support the shielding board, and guide rollers 57 disposed at the front and back ends of the mounting frame on each side of it project into and are guided by the arc guide 58 (in FIG. 4) situated along the curved part of the conveyor. Coupling pins 59 are disposed at the center of the mounting frame 55, and at the ends thereof links 60 are connected. The other ends of the links 60 are connected to the swing levers 61 supported on shafts 63, intermediate pins 62 of which are engaged in cam grooves 65 of cam 64. Therefore, when the cams 64 are rotated so as to correspond to rotation timing of the cam 51*a* of the bottle removal means shown in FIG. 4, the shielding board 53 slides up and down in dependence on the motion of the swing lever 61, and this sliding motion makes the gap 54 open or close, so that it is possible to remove the lined up bottle groups 7 from the alternate holder rows 4. As described above, in the present invention, by operation the bottle supply sequentially separately in turn using bottle insertion means arranged in a plurality of places or in stages along the bottle handling conveyor, a rapid increase of efficiency and reduction of the installation space can be expected. And it is clear that also on the delivery side the bottle removal means arranged at a plurality of places or in stages makes possible rational conveyor handling and many ways of bottle handling.

In the preferred embodiments shown in the drawings, the bottle feeding is of a multistage construction, though it is not always necessary to be so. For instance, it is possible to use an oscillating shaking-out mechanism which devides and pushes out the lined up bottle groups to both sides of a bottle feeding unit and the bottles are received by two rotary insertion devices of the blade wheel type using half parts thereof, and at the same time the location thereof is changed so as to lower the bottles onto the level of the handling conveyor located below. As for the bottle delivery conveyor, it is also possible to make the conveyor a single structure by changing the guide board shown. Many varied types of the bottle insertion means as well as the bottle removal means can be used instead of the ones shown as the embodiments.

While certain preferred embodiments of the invention have been disclosed, it will be appreciated that modifications may be made within the spirit of the invention.

What is claimed is:

1. In a bottle handling apparatus, the combination comprising:

bottle conveyor means for continuously conveying bottles which are mounted thereon in groups, each group containing a selected number of bottles disposed in a line, said bottle conveying means having a plurality of bottle holding means arranged in series therealong, each said bottle holding means being adapted for holding one of said bottle groups therein;

bottle feeding means for sequentially supplying said groups of bottles to said conveying means, said bottle feeding means including first and second bottle insertion devices arranged at spaced locations along the feeding direction of the bottle conveying means, said first insertion device putting bottle groups into said holder means which are at regularly spaced locations in the series defined by said plurality of holder means, and said second bottle insertion device putting bottle groups into other holder means which are at regularly spaced locations along said series and are left vacant by said first insertion device;

each said insertion device including stationary guide means extending between a first position wherein a bottle group is supplied thereto and a second position which is vertically spaced above said first position and is disposed closely adjacent said conveyor means, said guide means having elongated guide surfaces thereon for slidably engaging and supporting the bottle group as it is moved from said first position to said second position;

each said insertion device further including bottle displacement means adapted for engaging the bottle group for displacing same from said first position into said second position and then inserting same into one of said holder means, said bottle displacing means including first movable means for engaging the bottoms of the individual bottles of the bottle group for slidably displacing said bottle group along said guide surfaces from said first position to said second position and second movable means for engaging the bottle group adjacent said second position and for pushing same into one of said holder means;

said first movable means including a bottle moving member supported for rotation about an axis, said bottle moving member having a portion thereof disposed for engaging a bottle at said first position and moving same to said second position during each revolution of said bottle moving member, the angular displacement of said bottle moving member in displacing a bottle between said first and second positions being substantially less than a complete revolution;

drive means drivingly interconnected to said bottle moving member for causing rotation thereof about said axis;

said second movable means including a bottle moving lever mounted for swingable oscillating movement about a further axis which is substantially parallel to said above-mentioned axis, said bottle moving lever being swingable back and forth between a first location wherein said lever engages a bottle which is disposed at said second position and a second location wherein the lever inserts a bottle into one of said holder means; and motion connecting means drivingly connected between said bottle moving member and said bottle moving lever for synchronously moving same according to a preselected pattern, said motion connecting means including cam means rotating synchronously with said bottle moving member and follower means disposed in engagement with said cam means and interconnected with said bottle moving lever for causing oscillation of said bottle moving lever responsive to rotation of said cam means.

2. An apparatus according to claim 1, wherein the guide surfaces defined by said guide means are in part of a convex curvature so that said bottle group when in said first position is disposed substantially upright whereas said bottle group when in said second position is disposed approximately horizontally, and said bottle moving member being supported for rotation about an axis disposed below said guide means, and said bottle moving member having a free end portion which projects outwardly beyond said guide means and engages the bottom of the bottle for slidably moving same therealong during a portion of the revolution of said bottle moving member.

3. An apparatus according to claim 2, wherein said bottle moving lever has the support axis thereof positioned upwardly above said guide means, said bottle moving lever extending downwardly from its pivot axis and having the lower free end thereof disposed for engagement, with the bottom of a bottle.

4. An apparatus according to claim 1, wherein said cam means and said bottle moving member are nonrotatably connected together, said cam means having a pair of identical cam profiles each of which extends through one half of a full revolution of said cam means, said pair of cam profiles being joined together to define a full revolution of said cam means so that said bottle moving lever undergoes two complete cycles of back-and-forth oscillating movement during each single full revolution of said bottle moving member.

5. An apparatus according to claim 4, wherein said bottle moving member has a pair of arm portions which project outwardly in diametrically opposite directions from its rotational axis, each of said arm portions having a part at the free end thereof adapted for engaging a bottle during rotation of said bottle moving member.

6. An apparatus according to claim 1, further including bottle removaL means associated with said bottle conveyor means for removing the bottle groups therefrom, said bottle removal means including first and second bottle removal devices disposed adjacent said conveyor means and spaced from one another in the direction of movement of said conveyor means for removing said bottle groups in at least two different stages, said first bottle removal device removing bottle groups from regularly spaced holder means in the series defined by said plurality of holder means, and said second bottle removal device removing the remaining bottle groups not removed by said first bottle removal device.

7. In a bottle handling apparatus, the combination comprising:

bottle conveyor means for continuously conveying bottles which are mounted thereon in groups, each group containing a selected number of bottles disposed in a line, said bottle conveying means having a plurality of bottle holding means arranged in series therealong, each said bottle holding means being adapted for holding one of said bottle groups therein;

bottle feeding means for sequentially supplying said groups of bottles to said conveying means, said bottle feeding means including first and second bottle insertion devices arranged at spaced locations along the feeding direction of the bottle conveying means, said first insertion device putting bottle groups into said holder means which are at regularly spaced locations in the series defined by said plurality of holder means, and said second bottle insertion device putting bottle groups into other holder means which are at regularly spaced locations along said series and are left vacant by said first insertion device;

each said insertion device including stationary guide means extending between a first position wherein a bottle group is supplied thereto and a second position which is vertically spaced above said first position and is disposed closely adjacent said conveyor means, said guide means having elongated guide surfaces thereon for slidably engaging and supporting the bottle group as it is moved from said first position to said second position;

each said insertion device further including bottle displacement means adapted for engaging the bottle group for displacing same from said first position into said second position and then inserting same into one of said holder means, said bottle displacing means including first movable means for engaging the bottoms of the individual bottles of the bottle group for slidably displacing said bottle group along said guide surfaces from said first position to said second position and second movable means for engaging the bottle group adjacent said second position and for pushing same into one of said holder means;

bottle removal means associated with said bottle conveyor means for removing the bottle groups therefrom, said bottle removal means including first and second bottle removal devices disposed adjacent said conveyor means and spaced from one another in the direction of movement of said conveyor means for removing said bottle groups in at least two different stages, said first bottle removal device removing bottle groups from regularly spaced holder means in the series defined by said plurality of holder means, and said second bottle removal device removing the remaining bottle groups not removed by said first bottle removal device; and said bottle conveyor means including an elongated bottle removal portion which faces at least partially in a downward direction so that the bottle groups as held within said holder means project partially downwardly, and elongated stationary guide means associated with the bottle removal portion of said conveyor means for holding the bottle groups within the holder means, said elongated guide means extending between a first removal station as defined adjacent said first bottle removal device and a second bottle removal station as defined adjacent said second bottle removal device.

8. An apparatus according to claim 7, wherein said first bottle removal device is disposed upstream of said second bottle removal device when viewed in the feeding direction of said conveyor means, and movable blocking means disposed at said first bottle removal station and coacting with said stationary guide means for permitting the selective formation of a gap at said first station to permit the selective removal of bottle groups from said conveyor means, said blocking means being positioned adjacent said conveyor means for preventing the bottle groups from being removed from said holder means, and drive means connected to said blocking means for reciprocating same between a blocking position wherein the blocking means is disposed adjacent said stationary guide means and a retracted position wherein the blocking means is separated from the stationary guide means by a gap sufficient to permit a bottle group to be removed from said holder means.

9. An apparatus according to claim 7, wherein each said bottle removal device includes:

a stationary bottle guide extending from a first location positioned closely adjacent but beneath the bottle removal portion of said conveyor means and a second location which is positioned vertically below said first location;

a bottle support means adapted to engage the bottom of the bottle group for lowering same from said first location into said second location, said bottle support means being reciprocably movable between said first and second locations; and pushing means reciprocable in a direction substantially transverse to the direction of movement of said bottle support means for pushing said bottle group sidewardly from said second location onto a delivery conveyor.

10. An apparatus according to claim 9, wherein said delivery conveyor has an upper receiving surface adapted to receive thereon said bottle group, and said bottle support means having an upper support surface which is substantially aligned with and forms a continuation of said receiving surface when said support means is in said second location.

11. An apparatus according to claim 10, wherein said support means is supported for reciprocating angular movement between said first and second locations about a swing axis, said pushing means including a reciprocating pushing member adapted to engage the bottle group when in said second location and a reciprocating mechanism connected to said pushing member for reciprocating same, said reciprocating mechanism including a driving member interconnected to said pushing member and supported for angular reciprocation about said swing axis, a driving means drivingly interconnected to said driving member for causing angular reciprocation of same through a preselected angular extent, and cooperating means coacting between said driving member and said support means so that said driving member causes angular reciprocating movement of said support means through only a limited arcuate extent of the reciprocating movement of said driving member.

12. In a bottle handling apparatus, the combination comprising:

bottle conveyor means for continuously conveying bottles which are mounted thereon in groups, each group containing a selected number of bottles disposed in a line, said bottle conveying means having a plurality of bottle holding means arranged in series therealong, each said bottle holding means being adapted for holding one of said bottle groups therein;

bottle feeding means for sequentially supplying said groups of bottles to said conveying means, said bottle feeding means including first and second bottle insertion devices arranged at spaced locations along the feeding direction of the bottle conveying means, said first insertion device putting bottle groups into said holder means which are at regularly spaced locations in the series defined by said plurality of holder means, and said second bottle insertion device putting bottle groups into other holder means which are at regularly spaced locations along said series and are left vacant by said first insertion device;

each said insertion device including stationary guide means extending between a first position wherein a bottle group is supplied thereto and a second position which is vertically spaced above said first position and is disposed closely adjacent said conveyor means, said guide means having elongated guide surfaces thereon for slidably engaging and supporting the bottle group as it is moved from said first position to said second position;

each said insertion device further including bottle displacement means adapted for engaging the bottle group for displacing same from said first position into said second position and then inserting same into one of said holder means, said bottle displacing means including first movable means for engaging the bottoms of the individual bottles of the bottle group for slidably displacing said bottle group along said guide surfaces from said first position to said second position and second movable means for engaging the bottle group adjacent said second position and for pushing same into one of said holder means;

said guide means including a plurality of substantially parallel guide elements which are arranged in pairs, the guide elements of each pair being laterally separated so as to support a bottle thereon from both sides, and said first movable means including a plurality of movable insertion fingers each of which projects between the laterally separated pair of guide elements for engaging the bottom of a bottle to thereby slidably displace the bottom from said first position to said second position;

said second movable means including a plurality of pushing members mounted for reciprocating movement between a retracted position and an extended position, said pushing members when in said retracted position being adapted to engage the bottoms of the bottle group disposed in said second position, whereby movement of said pushing members into said extended position causes said bottle group to be fully inserted into one of said holder means; and each pushing member comprising two planar elements which are spaced apart and between which can pass the end of an insertion finger as same projects between a corresponding pair of laterally spaced guide elements.

13. In a bottle handling apparatus, the combination comprising:

bottle conveyor means for continuously conveying bottles which are mounted thereon in groups, each group containing a selected number of bottles disposed in a line, said bottle conveying means having a plurality of bottle holding means arranged in series therealong, each said bottle holding means being adapted for holding one of said bottle groups therein;

bottle feeding means for sequentially supplying said groups of bottles to said conveying means, said bottle feeding means including first and second bottle insertion devices arranged at spaced locations along the feeding direction of the bottle conveying means, said first insertion device putting bottle groups into said holder means which are at regularly spaced locations in the series defined by said plurality of holder means, and said second bottle insertion device putting bottle groups into other holder means which are at regularly spaced locations along said series and are left vacant by said first insertion device;

each said insertion device including stationary guide means extending between a first position wherein a bottle group is supplied thereto and a second position which is vertically spaced above said first position and is disposed closely adjacent said conveyor means, said guide means having elongated guide surfaces thereon for slidably engaging and supporting the bottle group as it is moved from said first position to said second position;

each said insertion device further including bottle displacement means adapted for engaging the bottle group for displacing same from said first position into said second position and then inserting same into one of said holder means, said bottle displacing means including first movable means for engaging the bottoms of the individual bottles of the bottle group for slidably displacing said bottle group along said guide surfaces from said first position to said second position and second movable means for engaging the bottle group adjacent said second position and for pushing same into one of said holder means;

said guide means including a plurality of substantially parallel guide elements which are arranged in pairs, the guide elements of each pair being laterally separated so as to support a bottle thereon from both sides, and said first movable means including a plurality of movable insertion fingers each of which projects between the laterally separated pair of guide elements for engaging the bottom of a bottle to thereby slidably displace the bottom from said first position to said second position;

the guide surfaces defined by said guide elements being in part of a convex curvature so that said bottle group when in said first position is disposed substantially upright whereas said bottle group when in said second position is disposed approximately horizontally, and said insertion fingers being supported below said guide elements so that said fingers project between the adjacent pair of said guide elements, said fingers being supported for rotation about an axis disposed below said guide elements whereby said fingers cause said bottle group to be slidably moved along said guide elements from said first position into said second position; and a bottle supply unit for supplying a bottle group to each of said first and second insertion devices at said first position, said bottle supply unit including a bottle conveyor having a row of bottles adapted to be supported on the upper reach thereof, a bottle pushing member for displacing a bottle group sidewardly from said conveyor into said first position which is disposed adjacent one side of said conveyor, and a planetary gear mechanism drivingly connected to said pushing member for causing reciprocation thereof, said planetary gear mechanism including a rotatable planet gear disposed in meshing engagement with a fixed sun gear so as to rotate therearound, said planetary gear mechanism also including an arm member fixed to said planet gear and rotatable therewith, said arm member being connected to said bottle pushing member at a location disposed radially from the rotational axis of said planet gear.

* * * * *